United States Patent
Brown

[15] 3,635,000
[45] Jan. 18, 1972

[54] COMBUSTION GAS SCRUBBING SYSTEM

[72] Inventor: Robert F. Brown, Piscataway Township, N.J.

[73] Assignee: Research-Cottrell, Inc., Bridgewater, N.J.

[22] Filed: Mar. 13, 1970

[21] Appl. No.: 19,386

[52] U.S. Cl............................55/89, 23/2, 55/223, 55/228, 261/7, 261/22, 261/94
[51] Int. Cl..........................................B01d 47/00
[58] Field of Search...................55/22, 73, 89–94, 55/223, 228; 261/2–8, 94, 95, DIG. 9, DIG. 54; 23/2, 178

[56] References Cited

UNITED STATES PATENTS

| | | |
|---|---|---|
| 3,116,348 | 12/1963 | Walker.............................261/44 |
| 3,320,906 | 5/1967 | Domahidy......................55/228 X |
| 3,439,724 | 4/1969 | Mason...............................159/13 |
| 3,520,649 | 7/1970 | Tomany et al........................23/2 |

*Primary Examiner*—Reuben Friedman
*Assistant Examiner*—R. W. Burks
*Attorney*—Stowell & Stowell

[57] ABSTRACT

Suspended particulate matter, including sulfur-containing compounds of calcium and magnesium, and sulfur oxides are removed from combustion gases by passing the gases successively through a high-velocity venturi-type scrubber and a wetted film-packed bed scrubber. Scrubbing liquid from the venturi scrubber and from the packed bed scrubber may, after being clarified, be recirculated to the two scrubbing stages.

5 Claims, 1 Drawing Figure

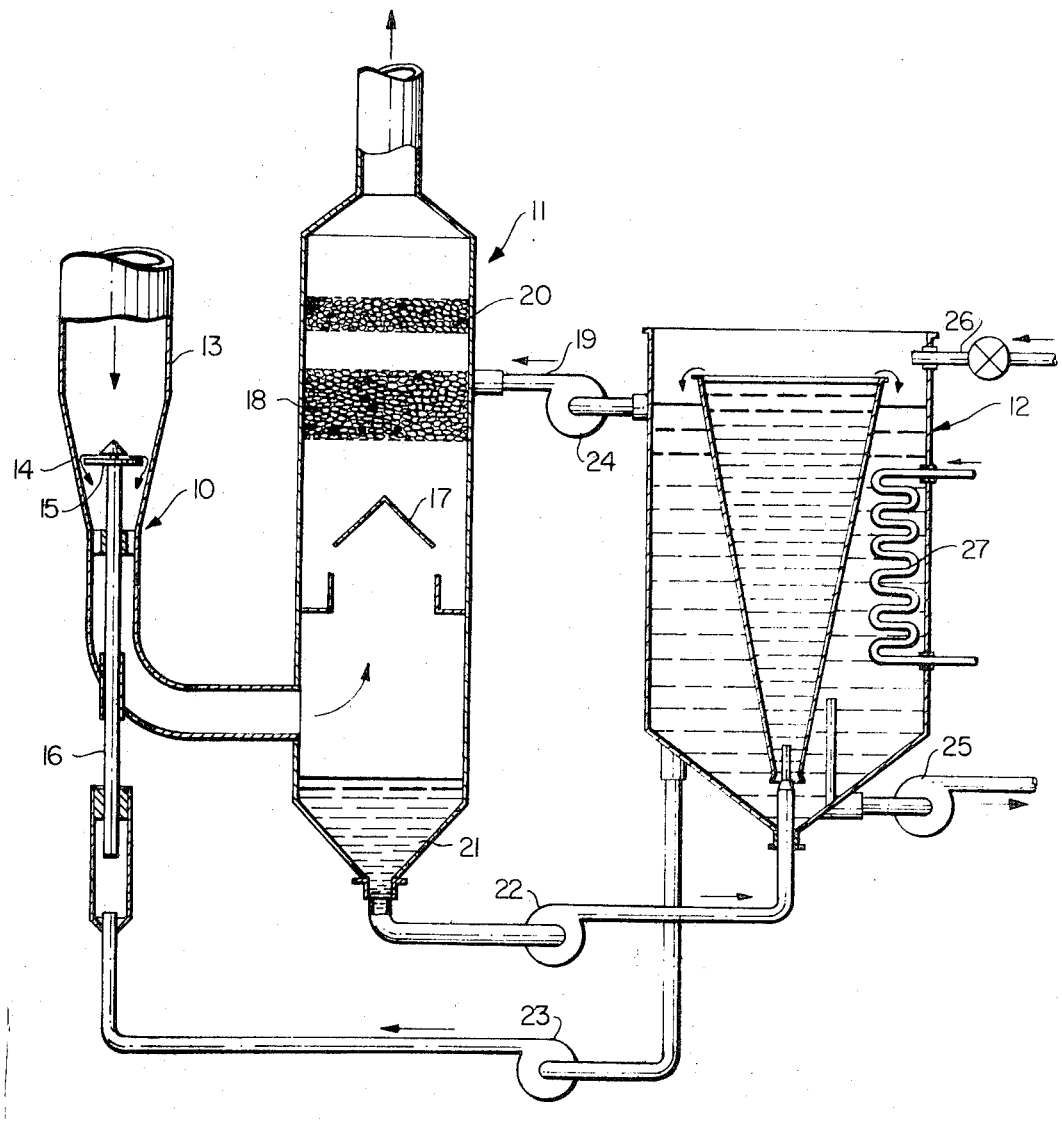

COMBUSTION GAS SCRUBBING SYSTEM

This invention relates to methods and apparatus for removing suspended solids and acidic gaseous contaminants from flue gases generated by the combustion of sulfur-containing fuels and particularly to such methods and apparatus adapted for use in the removal of acidic sulfur oxides and suspended particulate solids including fly ash and sulfur-containing compounds of calcium and magnesium resulting from the addition of limestone or dolomitic limestone, in calcined or uncalcined condition, to sulfur-containing fuel supplied to combustion furnaces or to the combustion gases therefrom either directly or suspended in scrubbing liquor therefor.

The addition of limestone or dolomitic limestone to sulfur-containing fuels as supplied to combustion furnaces or to the gaseous combustion products of such fuels is well known but the removal of the particulate suspended particles, including sulfites and sulfates of calcium, from the combustion gases by a single-stage treatment typically in fixed or dynamic packed bed-scrubbing devices has entailed disadvantages, arising from the relatively high temperature of the gases and the high pressure drop of the gases passing therethrough, and resulting in the buildup of solids in the scrubbing devices which causes them to become ineffective or inoperative after short periods of use.

These disadvantages are avoided in the methods and apparatus of the present invention which comprises passing the combustion gases containing suspended particulate matter, including sulfur-containing compounds of calcium and magnesium and sulfur oxides, successively through a high velocity venturi type scrubber and a wetted film-packed bed scrubber.

Suitable high velocity venturi-type scrubbers are described in U.S. Pat. No. 3,116,348 to A. B. Walker.

The wet film-packed bed scrubber may comprise either fixed packing such as Munters Corporation "Plasdek" or "Asbesdek" packing or dynamic packing such as lightweight hollow spheres.

Scrubbing liquid from the venturi scrubber and from the packed bed scrubber may, after being clarified, be recirculated to the two scrubber stages.

The principles of the invention will be more particularly described with reference to the illustrative layout of apparatus shown in the accompanying drawing.

In the drawing, 10 is a flooded disc venturi scrubber of the type described in the above-identified Walker patent, 11 is a packed bed scrubber and 12 is a clarifier.

The venturi scrubber 10 comprises a vertical conduit 13 having a converging flow section 14 in which is positioned a vertically adjustable horizontal disc 15 supplied with scrubbing liquid through pipe 16. Combustion gases containing suspended particulate matter including fly ash and calcium and magnesium sulfites and sulfates enters the venturi scrubber at the top, pass through the converging section 14 between disc 15 and the wall of the converging section and flow together with the scrubbing liquid through the lower end of scrubber 10 into the lower portion of packed tower scrubber 11.

In scrubber 11 the gases pass upward past distributor 17, through packed section 18 containing, for example, Munter's packing and supplied with scrubbing liquid through pipe 19, and thence through mist eliminator 20, which may also contain Munter's packing, to the atmosphere or other disposal.

Scrubbing liquid slurry containing suspended particulate matter removed from the combustion gas in both the venturi scrubber 10 and the packed scrubber 11 collects in sump 21 of scrubber 11 whence it is removed by pump 22.

Preferably the scrubbing liquid slurry is pumped into clarifier 12, whence a portion of the clarified liquid may be recycled to venturi scrubber 10 by pump 23 and a further portion recycled to packed scrubber 11 by pump 24.

Sludge is removed from the bottom of clarifier 12 by pump 25. Makeup liquid may be added to clarifier 12 through pipe 26 and the temperature of the liquid in the clarifier may be maintained at a desired level by means of heating coil 27.

In an illustrative mode of operation, sufficient calcined dolomitic limestone is added to combustion gases containing suspended fly ash and acidic oxides of sulfur from a powdered coal boiler and having a temperature above about 250° F., to neutralize the sulfur oxides and the gases are then passed in to the top of flooded disc scrubber 10.

Particulates in the gas are removed by inertial impact scrubbing by recycled liquor from clarifier 12 in the converging flow section 14 and a substantial portion of the gaseous sulfur oxides are removed from the gas by reaction with the calcined limestone in section 14 and in the conduit therefrom into scrubber 11, forming sulfites and sulfates of calcium and magnesium which pass with the scrubbing liquid into sump 21 of scrubber 11. At a rate of 5 to 10 gallons of liquid and 1,000 cubic feet of gas per minute about 99 percent of the fly ash is removed and 60 to 70 percent of the sulfur oxides are removed as nongaseous reaction in suspension and solution in the liquid. The gases are also cooled to adiabatic saturation temperature of about 110°–120° F.

The cooled gases are then contacted with clarified scrubbing liquid in the packed section 18 of scrubbing tower 11 wherein substantially all of the remaining suspended particles and sulfur oxides are removed by contact with clarified liquid from clarifier 12.

Since the major portion of the particulate matter and sulfur oxides in the combustion gases are removed in the concurrent open flow venturi-type scrubber 10 the possibility of fouling in the second stage packed scrubber are greatly reduced. Moreover, the gas and liquid phases in the second stage are in substantial thermal equilibrium further reducing the possibility of crystallization in that stage.

In order to further reduce the possibility of crystallization in the second scrubber stage the liquid in the clarifier, or in passage from the clarifier to the packed section of the second stage, may be heated to above the temperature of the gas entering the second stage.

I claim:

1. A multiple stage method removing particulate matter and sulfur oxides from sulfur-containing fuels by contact with recirculated aqueous scrubbing liquid comprising:
   A. passing a mixture of gases and the calcination products into contact with recirculated scrubbing liquid in a concurrent flow venturi-type first scrubber to separate and remove a major portion of entrained insoluble particulates and sulfur oxides;
   B. contacting the gas precleaned in the first scrubber with separately recirculated scrubbing liquid in a wetted film second scrubber to substantially remove remaining particulates and sulfur oxides;
   C. recirculating scrubbing effluent from the first and second scrubbers through a clarifier and collecting and removing solid materials therein;
   D. heating the clarified scrubbing liquid to a temperature to prevent crystallization and deposition of slightly soluble salts in the first and second scrubbers; and
   E. passing the cleaned gas through a subsequent fixed bed packing to remove entrained liquid prior to discharging the cleaned gas.

2. A method as claimed in claim 1, wherein the scrubbing liquid is heated to a temperature higher than that of the gas entering the second scrubber prior to recirculation therethrough.

3. Apparatus for removing particulate matter and sulfur oxide products with calcined limestone from combustion gases of sulfur-containing fuels comprising:
   A. a high velocity venturi-type first scrubber;
   B. a wetted film-packed bed second scrubber;
   C. a solid materials collecting and removing clarifier;
   D. conduit means for passing the combustion gases successively through said scrubbers;
   E. conduit means for conveying liquid and entrained particles from said scrubbers to said clarifier;

F. recirculating conduit means for conveying clarified liquid from said clarifier separately to said first and second scrubbers;

G. heating means for heating clarified liquid prior to recirculating to said scrubbers to prevent deposition of slightly soluble salts in said first and second scrubbers; and H. a fixed bed packing subsequent to said second scrubber for removing entrained liquid prior to discharging cleaned gas.

4. Apparatus as claimed in claim 3, wherein said first scrubber comprises a flooded-disc scrubber.

5. Apparatus as claimed in claim 4, wherein said second scrubber comprises a packed bed of high specific surface area and low pressure drop.

* * * * *